United States Patent [19]
Kinnan

[11] 3,848,903
[45] Nov. 19, 1974

[54] ADJUSTABLE ELBOW FOR SPLIT CONDUIT

[76] Inventor: Frank R. Kinnan, P.O. Box 445, Camas Valley, Oreg. 97416

[22] Filed: June 22, 1973

[21] Appl. No.: 372,479

[52] U.S. Cl. .................................. 285/179, 174/86
[51] Int. Cl. .............................................. F16l 43/00
[58] Field of Search ......................... 285/155–157, 285/179, 183, 184, 185, 189, DIG. 8; 174/81, 84 R, 86, 87

[56] References Cited
UNITED STATES PATENTS

| 229,331 | 6/1880 | Orphy | 285/183 |
| 1,847,147 | 3/1932 | Thomas, Jr. | 174/87 X |
| 1,890,050 | 12/1932 | Fullman | 174/81 X |
| 1,921,056 | 8/1933 | Walker | 285/179 |
| 2,993,084 | 7/1961 | Curtiss | 285/179 X |

Primary Examiner—Richard J. Scanlan, Jr.
Attorney, Agent, or Firm—James D. Givnan, Jr.

[57] ABSTRACT

An elbow for reception and retention of conduit ends throughout a range of angular relationships between the conduit ends. The U-shaped main body of the elbow has inclined interior wall surfaces which in conjunction with a clip within the main body confine the inserted conduit ends against subsequent movement. A fastener element clamps the elbow walls about the conduit ends disposed therebetween.

3 Claims, 3 Drawing Figures

PATENTED NOV 19 1974  3,848,903
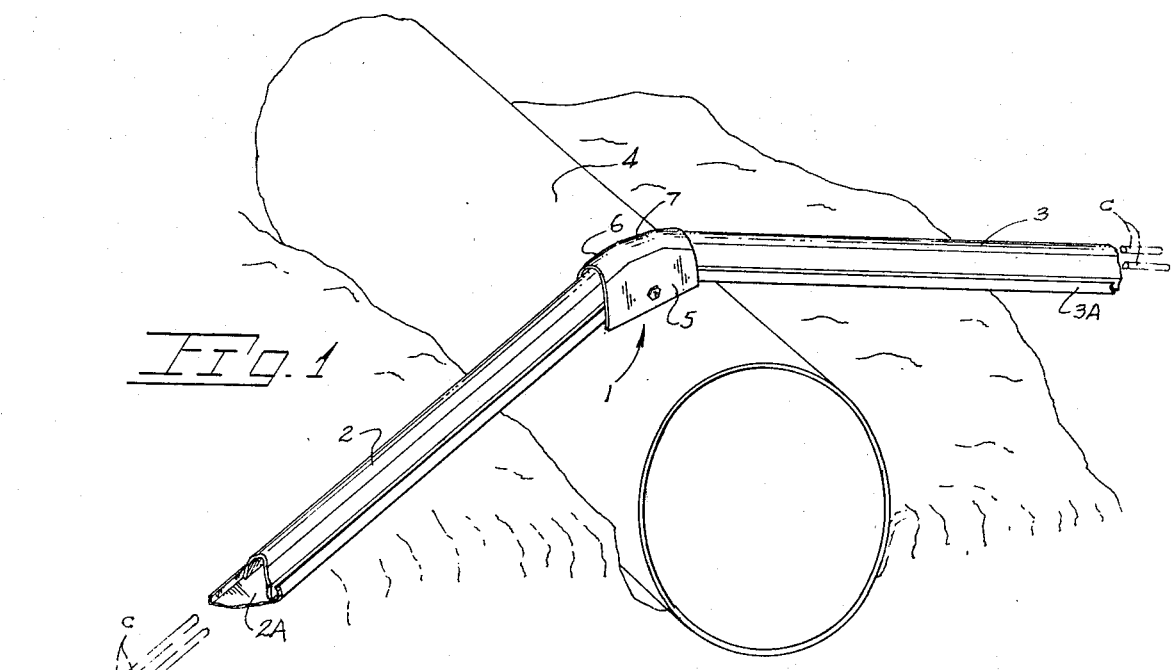
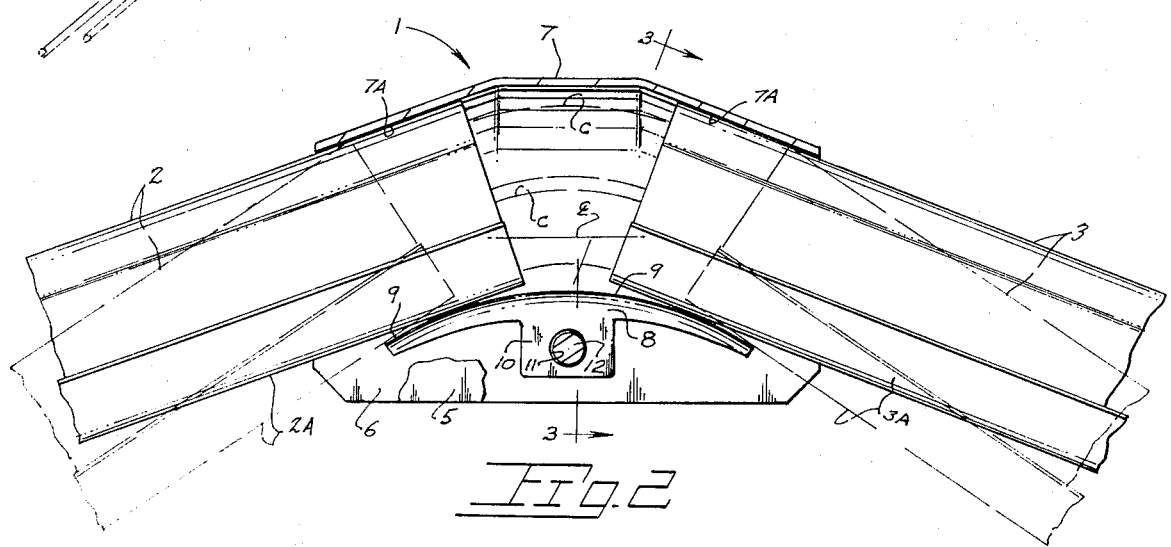
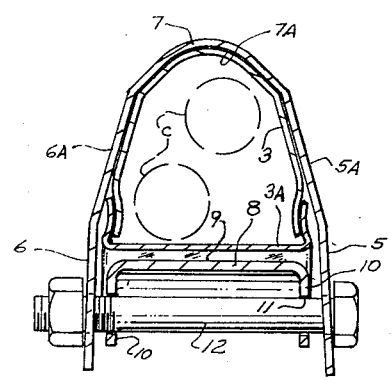

ADJUSTABLE ELBOW FOR SPLIT CONDUIT

BACKGROUND OF THE INVENTION

The present invention relates generally to elbow construction and more particularly to an elbow for interconnecting adjacent ends of conduit of the type serving as a housing for communications cables, electrical transmission cables, gas lines and the like.

For some period of time pipe has been used both above and below the ground surface as a protective enclosure or housing for the above mentioned transmission cables and lines. The use of pipe has a number of shortcomings, the most noticeable of which is the inability to receive added conduits or permit convenient removal of a conduit. To do such requires the complete withdrawal of the cables and lines housed therein with reinsertion of the new grouping all requiring considerable effort and time. To avoid such problems a cable enclosure has been introduced which is of a separable nature and known in the trade as split conduit which greatly facilitates both removal and the addition of a cable or cables to the conduit.

The present invention concerns an adjustable elbow for coupling the adjacent ends of split conduits in an universal manner permitting a wide range of angular relationships between conduit end segments.

SUMMARY OF THE INVENTION

The present invention is embodied within an elbow structure within which are secured the adjacent ends of split conduit with the elbow additionally serving to house sheathed cables passing from one split conduit to the other conduit. An internal clip member within the elbow engages both conduit ends sealing the elbow interior while a transversely extending threaded member permits a clamping action to be exerted on the elbow walls and split conduit therein to hold same securely within the elbow.

An important object of the present elbow is to provide an universal type elbow for securing split conduit ends within a wide range of angular relationships. Accordingly the split conduit lengths may circumvent various obstructions or otherwise change course with but one type of elbow being required.

A further important object is to provide an elbow which seals off that area intermediate the ends of adjacent split conduits regardless of the angular relationship of the split conduits to one another.

A still further important object is the provision for convenient removal and reinstallation of the split conduit ends within the elbow by means of a single fastener element of the elbow. Accordingly, the elbow and associated split conduits may be readily disassembled for the addition or removal of a cable from the split conduits.

Another important object is the provision of a curved clip within the elbow which bears equally on the inserted conduit ends upon tightening of the elbow on the conduit ends.

BRIEF DESCRIPTION OF THE DRAWING

In the accompanying drawing:

FIG. 1 is a perspective view of the present elbow angularly interconnecting the adjacent ends of a pair of split conduits, FIG. 2 is a fragmentary view of the present elbow with one wall thereof removed along a longitudinal centerline for purposes of illustration, and FIG. 3 is a sectional view of the elbow taken along line 3—3 of FIG. 2.

DESCRIPTION OF THE PREFERRED EMBODIMENT

With continuing attention to the accompanying drawing wherein applied reference numerals indicate parts similarly identified in the following description, the reference numeral 1 indicates generally the present elbow interconnecting the spaced ends of split conduits indicated at 2 and 3. Split conduits 2 and 3 are so termed for the reason that each includes a closure plate 2A–3A which is detachable permitting ready access to the conduit interior. Indicated at C are sheathed cables which may be of the type used in the communications field.

A culvert at 4 is shown as a typical obstruction past which the split conduits must be routed necessitating a change in the course of the conduit. The culvert 4 or other obstruction may of course be below or above ground level with the split conduits 2 and 3 and elbow 1 (the latter embodying the present invention) all being useable both above or below ground.

Elbow 1 comprises a main body of generally U-shaped configuration having a pair of coextensive sidewalls 5 and 6 with each sidewall including inwardly inclined wall segments 5A–6A. A bridge portion 7 interconnects the sidewalls and is of curved configuration transversely of the elbows centerline with an inclined interior wall surfaces 7A. The configuration of wall surfaces 7A corresponds generally to the sectional shape of the split conduit as best viewed in FIG. 3. With joint reference to FIG. 2 the split conduit end portions are secured in surface contact with the elbow wall surfaces 7A or, as shown in dashed lines, the conduit end portions may be at a lesser included angle and in line or edge contact therewith. The location and size of the obstruction or the desired alteration of the conduits course will, of course, determine the angular relationship of the coupled conduit ends.

Disposed between the sidewalls 5 and 6 of the elbow is a clip member 8 having a curved interior surface 9 for abutment with the split conduits. The clip is flanged at 10 and thereat apertured at 11 to receive a threaded fastener 12 which extends through flanges 10 of the clip and the sidewalls 5 and 6 of the elbow main body. Tightening of fastener 12 serves to draw or close the sidewalls 5 and 6, inclined segments thereof at 5A–6A along with the curved bridge portion 7 of the main body about the conduit ends urging same into forceful abutment with clip surface 9. Once fastener 12 is tightened the conduit ends are secured against further angular displacement.

For disengagement of the present elbow from the conduit ends the fastener 12 and clip member 8 are simply removed whereupon the main body of the elbow may be simply lifted away from the conduit ends. Replacement of the elbow on the conduit ends is equally simple with the procedure being reversed.

While I have shown but one embodiment of the invention, it will be apparent to those skilled in the art that the invention may be embodied still otherwise without departing from the spirit and scope of the invention.

Having thus described the invention what I claim and desire to secure under a Letters Patent is:

1. An elbow for joining the ends of conduit in a desired angular relationship, said elbow comprising,
   a main body of U-shaped configuration and having opposed sidewalls and a bridge portion interconnecting the sidewalls, said bridge portion having wall surfaces inclined relative to the longitudinal centerline of the main body, said inclined wall surfaces being engageable with the conduit end portions,
   a clip intermediate said sidewalls and adapted to also bear upon the conduit end portions, and
   fastener means acting on said sidewalls to bias same inwardly into contact with the conduit end portions thereby holding same in fixed relationship at the desired angular relationship therebetween.

2. The elbow as claimed in claim 1 wherein said clip is of curved configuration for contact with the conduit end portions at different points along the latter as determined by the angular relationship between said conduit end portions.

3. The elbow as claimed in claim 1 wherein said main body additionally includes inwardly inclined wall segments, said last mentioned wall segments and the bridge portion of the main body being of a sectional configuration corresponding to the sectional configuration of the conduit joined thereby.

* * * * *